(12) United States Patent
Tomizawa

(10) Patent No.: US 7,448,292 B2
(45) Date of Patent: Nov. 11, 2008

(54) TRANSMISSION

(76) Inventor: Nobuo Tomizawa, 12027-4, Jyusanbugyou, Hitachinaka-shi, Ibaraki (JP)

( * ) Notice: Subject to any disclaimer, the term of this patent is extended or adjusted under 35 U.S.C. 154(b) by 341 days.

(21) Appl. No.: 10/574,238

(22) PCT Filed: Sep. 27, 2004

(86) PCT No.: PCT/JP2004/014118

§ 371 (c)(1),
(2), (4) Date: Mar. 30, 2006

(87) PCT Pub. No.: WO2005/033553

PCT Pub. Date: Apr. 14, 2005

(65) Prior Publication Data

US 2007/0062320 A1    Mar. 22, 2007

(30) Foreign Application Priority Data

Oct. 3, 2003    (JP) .............................. 2003-346383

(51) Int. Cl.
*F16H 3/32*    (2006.01)
(52) U.S. Cl. .......................................... 74/349; 74/352
(58) Field of Classification Search .................. 74/348, 74/349, 352
See application file for complete search history.

(56) References Cited

U.S. PATENT DOCUMENTS

| 53,202 | A | * | 3/1866 | Wait | 74/349 |
|---|---|---|---|---|---|
| 295,536 | A | * | 3/1884 | Gallup | 74/349 |
| 1,003,221 | A | * | 9/1911 | Wagner | 74/349 |
| 1,159,463 | A | * | 11/1915 | Barr et al. | 74/437 |
| 1,438,307 | A | * | 12/1922 | Hopper | 74/349 |
| 2,025,763 | A | * | 12/1935 | Martin | 74/337 |
| 2,875,628 | A | * | 3/1959 | Walter | 74/349 |
| 2,936,641 | A | * | 5/1960 | Voelkl | 74/349 |
| 3,209,609 | A | * | 10/1965 | Kirschmann | 74/349 |
| 6,499,373 | B2 | * | 12/2002 | Van Cor | 74/349 |

FOREIGN PATENT DOCUMENTS

| JP | 49-70378 | 6/1974 |
|---|---|---|
| JP | 63-75652 | 5/1988 |
| JP | 01303358 A | * 12/1989 |

\* cited by examiner

*Primary Examiner*—Ha D. Ho
(74) *Attorney, Agent, or Firm*—Muramatsu & Associates

(57) ABSTRACT

A transmission with a simple structure and mechanism, lightweight and compact is realized. In the transmission, a first rotation shaft coaxially fixed to a first turning transmission wheel and a second rotation shaft coaxially fixed to a second turning transmission wheel are arranged in parallel with each other. A support shaft is arranged to extend between the first turning transmission wheel and the second turning transmission wheel. An intermediary transfer wheel is provided on the support shaft rotatably and movably along the longitudinal direction of the support shaft. The intermediary transfer wheel contacts with a side peripheral surface of the first turning transmission wheel and the side peripheral surface of the second turning transmission wheel and moves longitudinally along the support shaft while maintaining the contact.

3 Claims, 13 Drawing Sheets

(a) Fig. 1 (b)
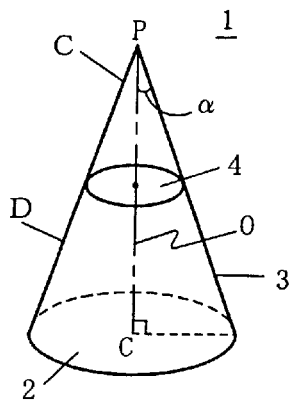 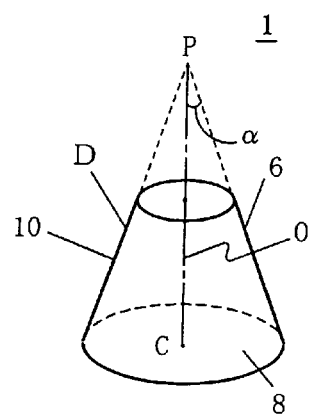
(c)
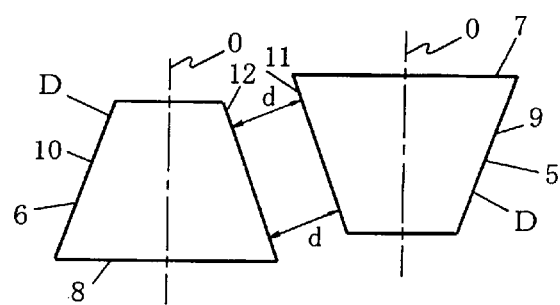
(d) (e)
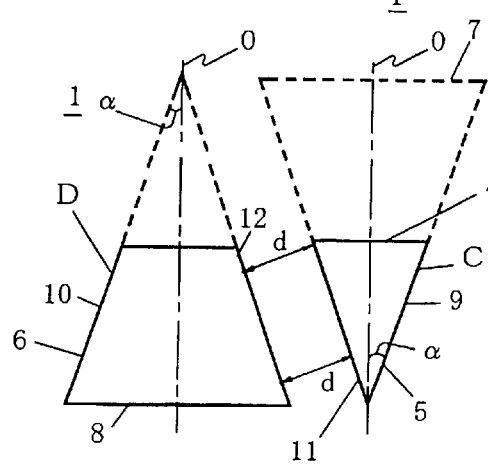 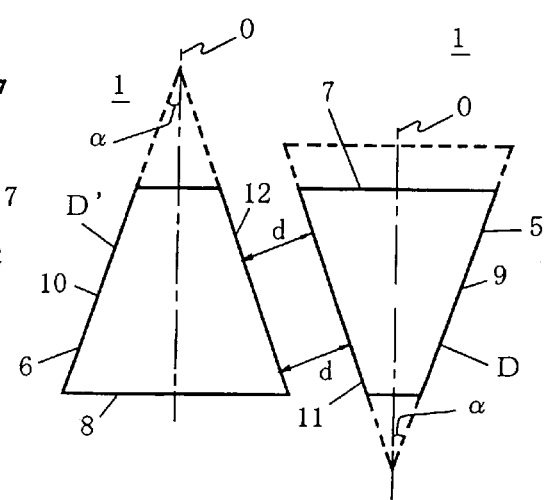

Fig. 2
(a)
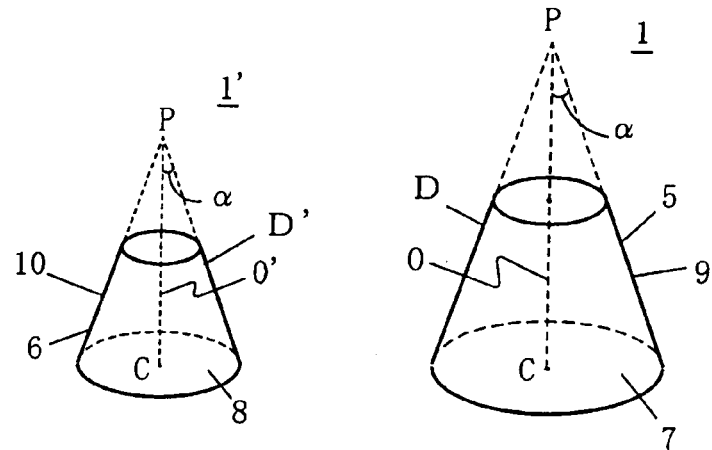
(b)
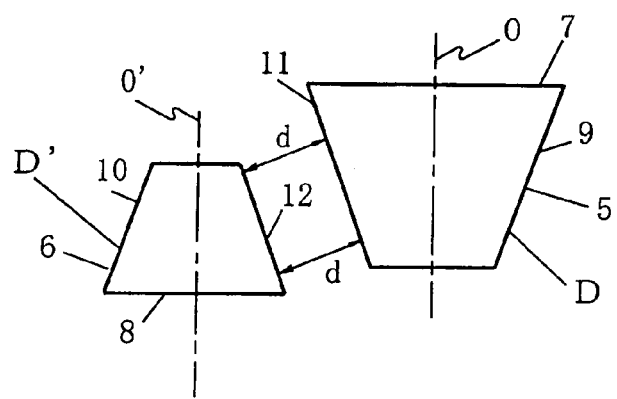
(c)
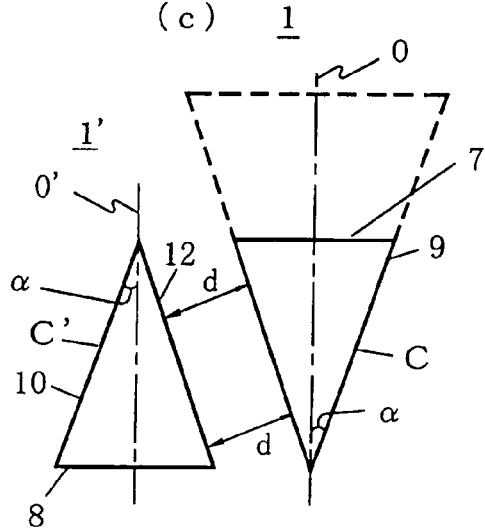
(d)
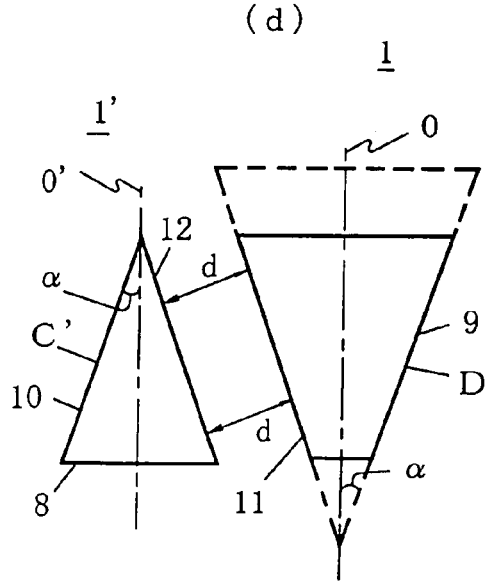

Fig. 3
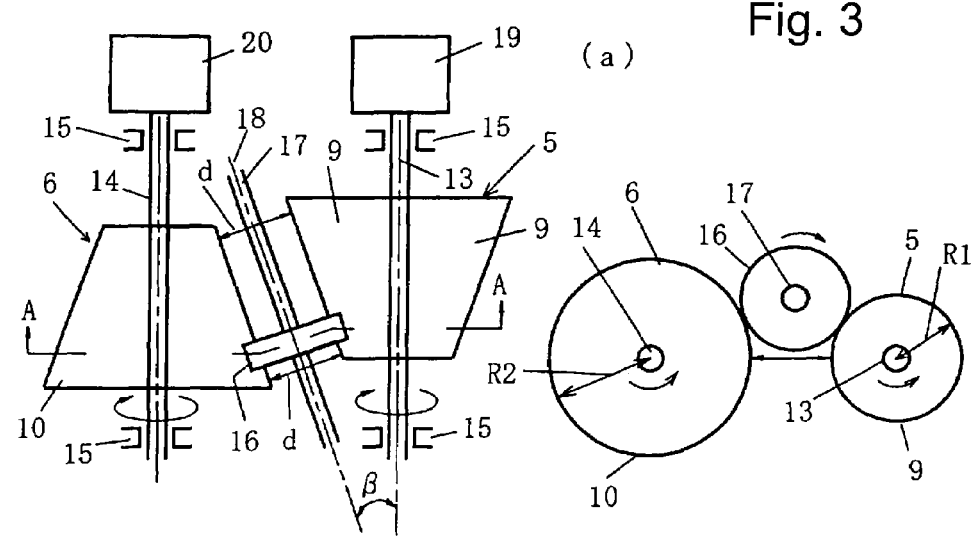
(a)
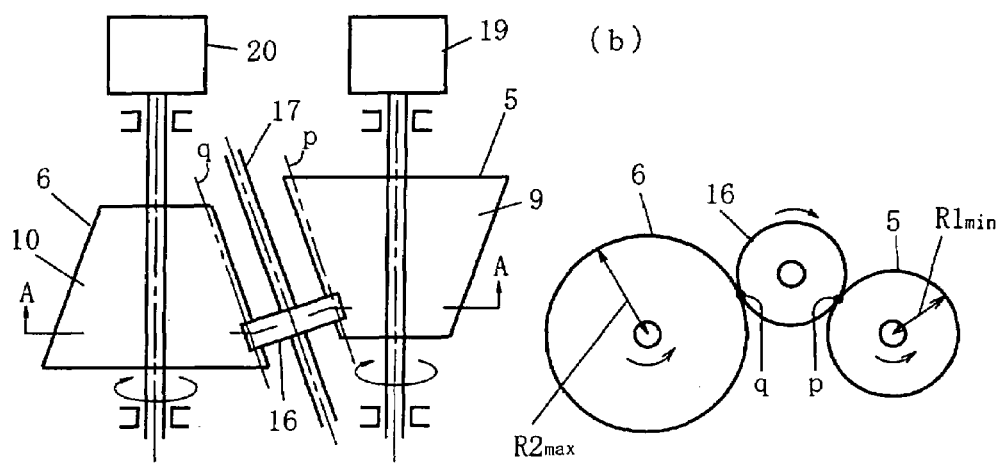
(b)
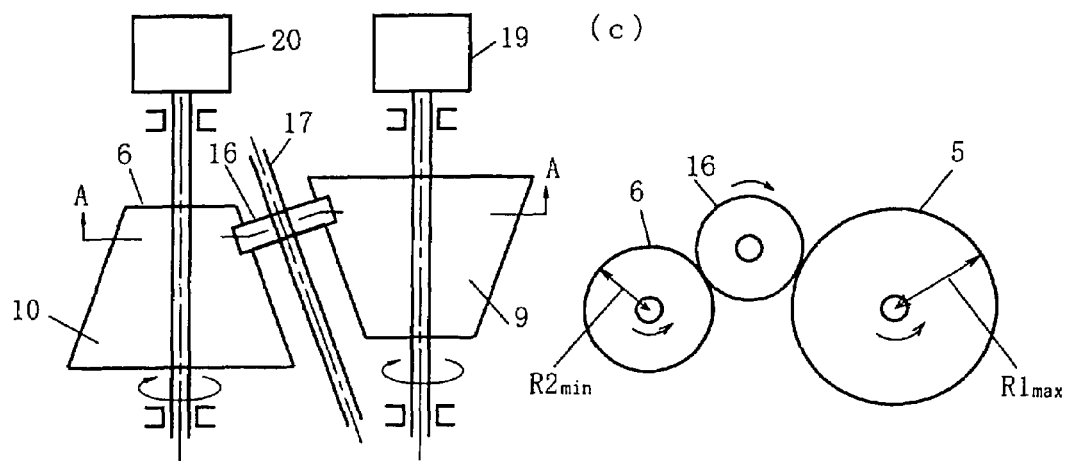
(c)

Fig. 4
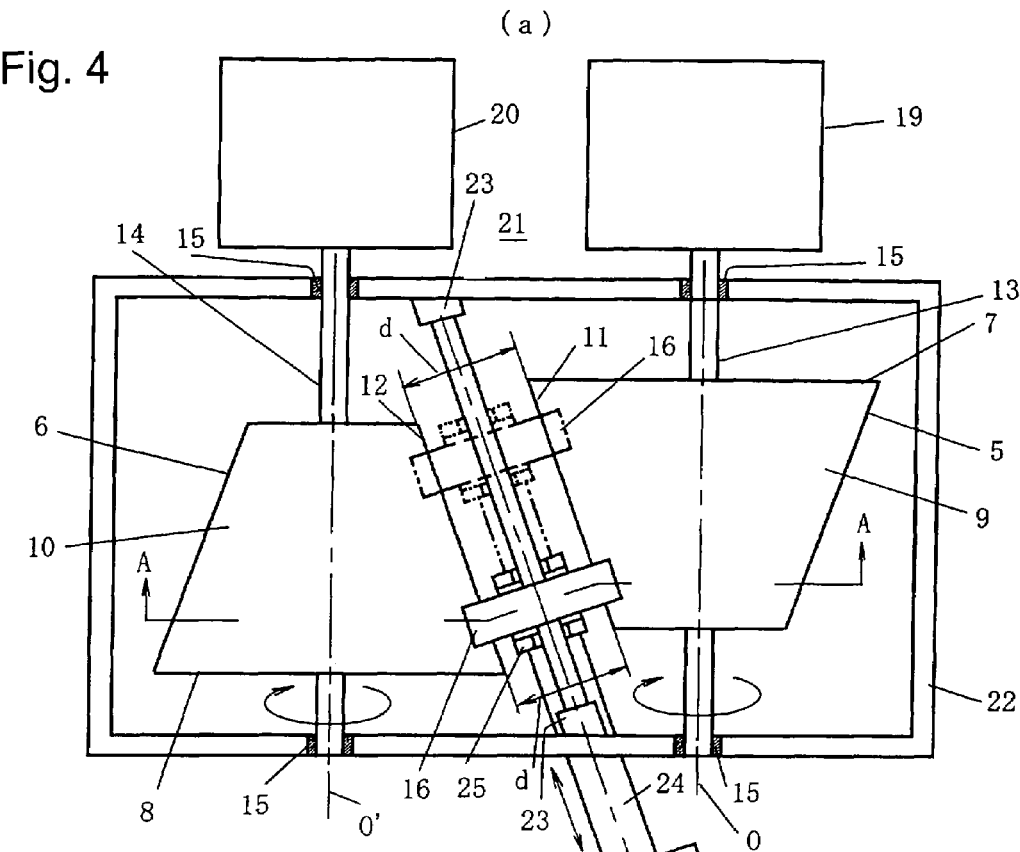
(a)
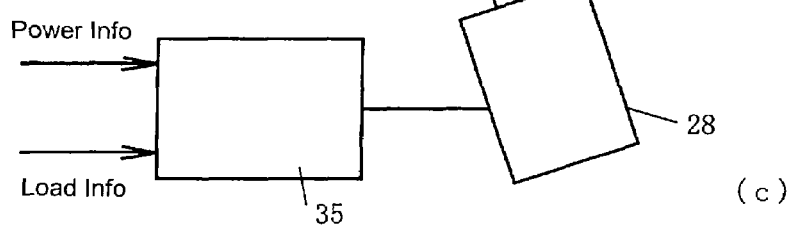
Power Info →
Load Info →  35
(b)
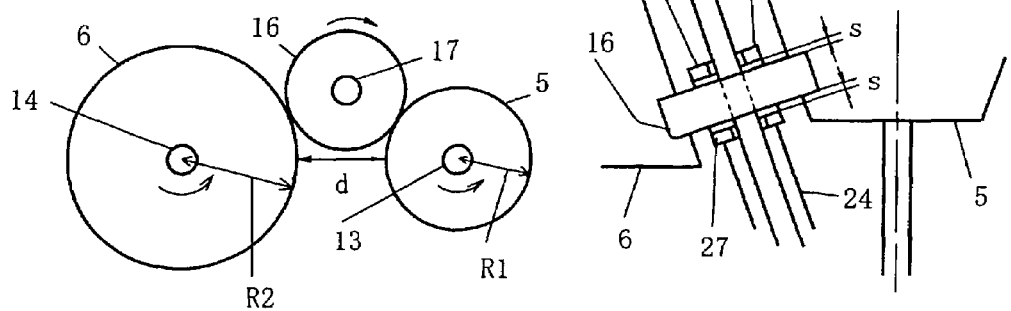
(c)

Fig. 8
(a)
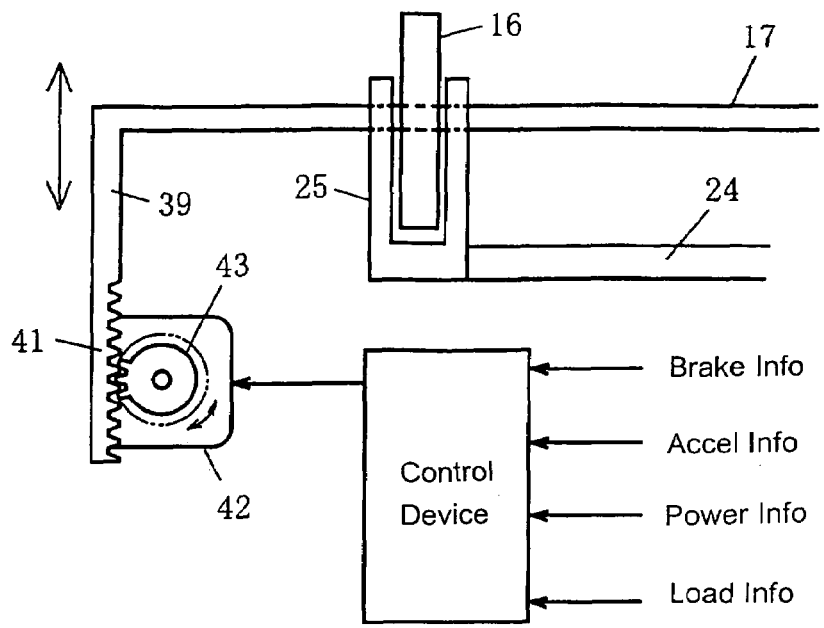
(b)
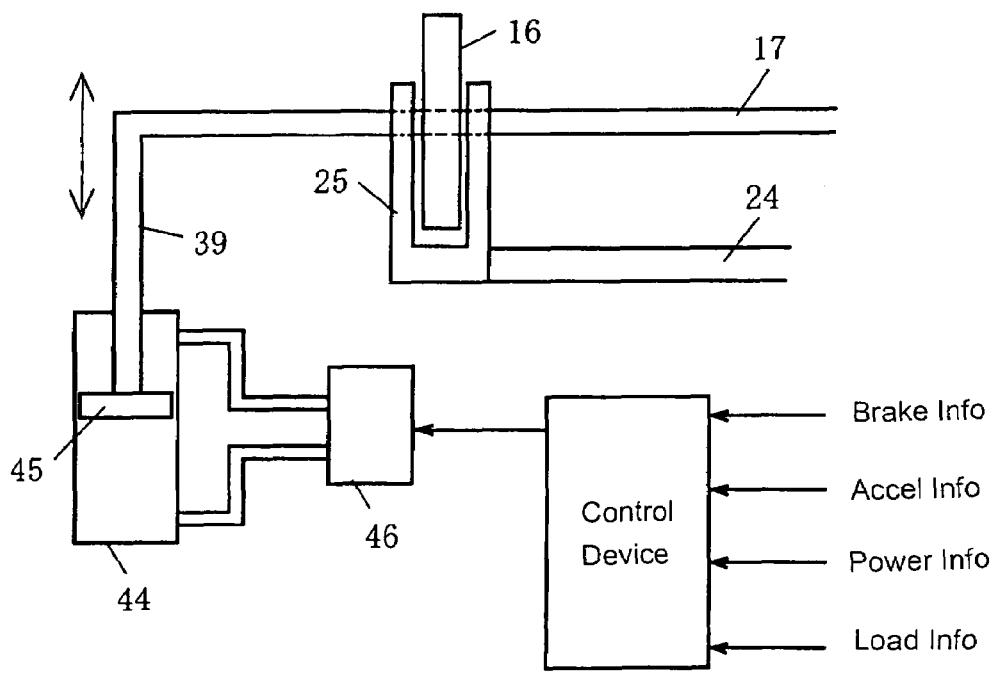

Fig. 9
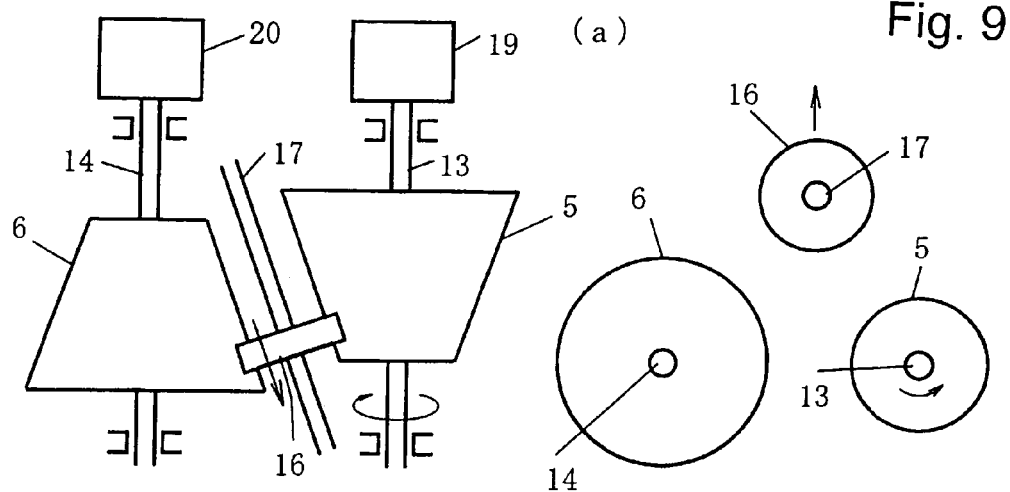
(a)
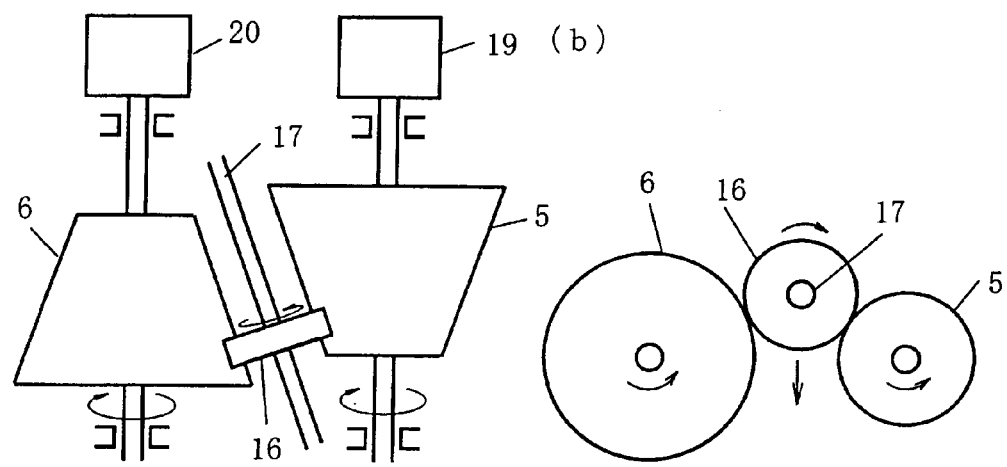
(b)
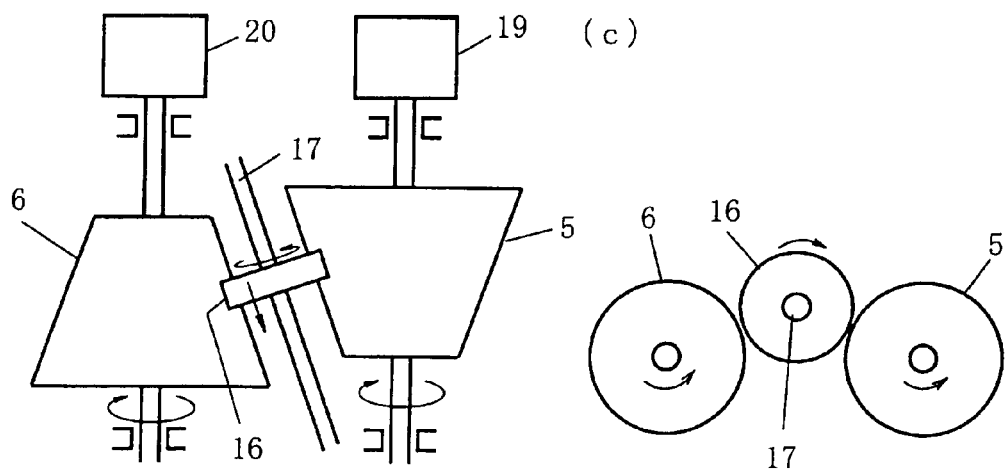
(c)

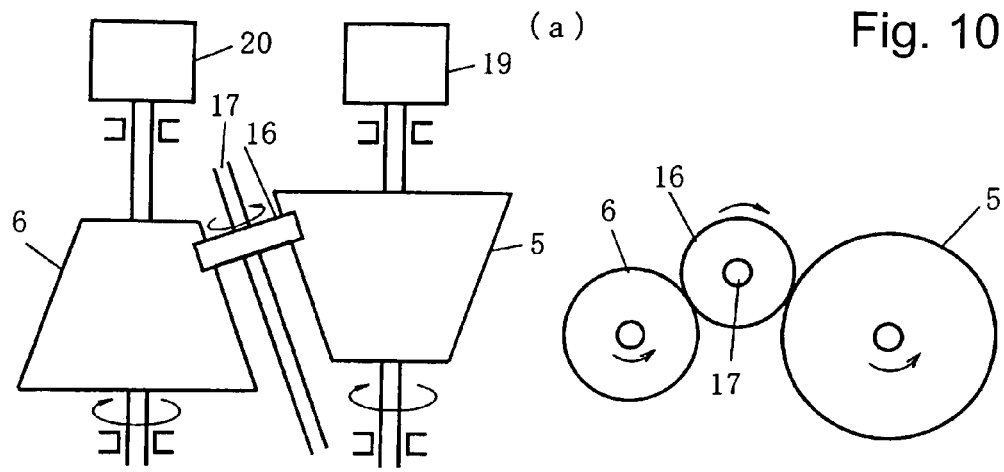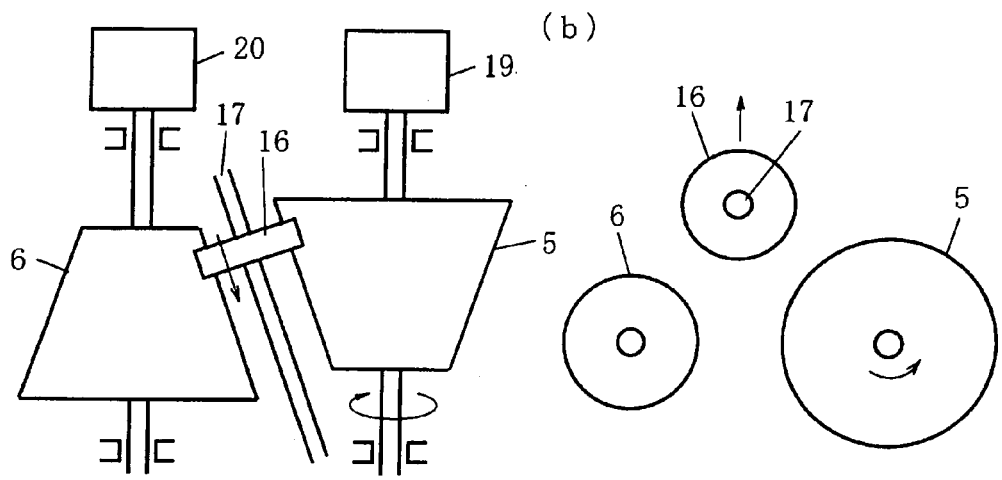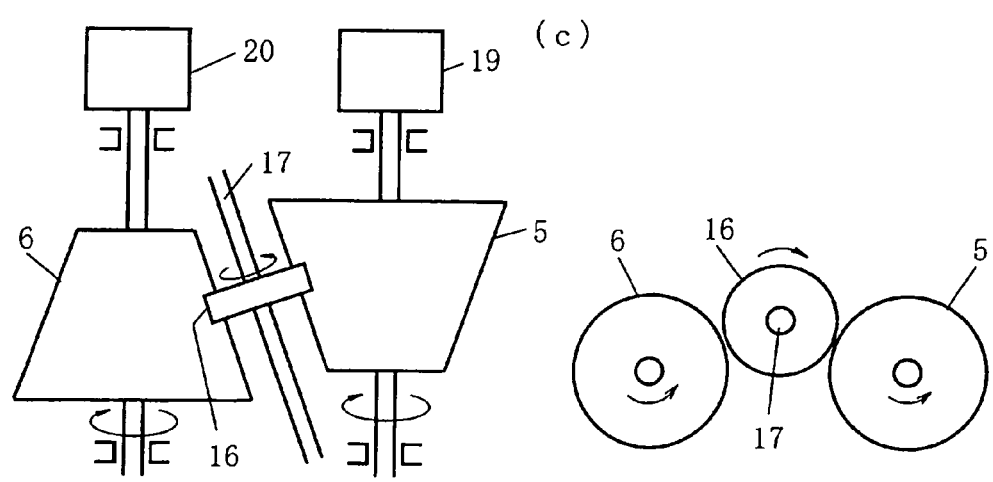
Fig. 10

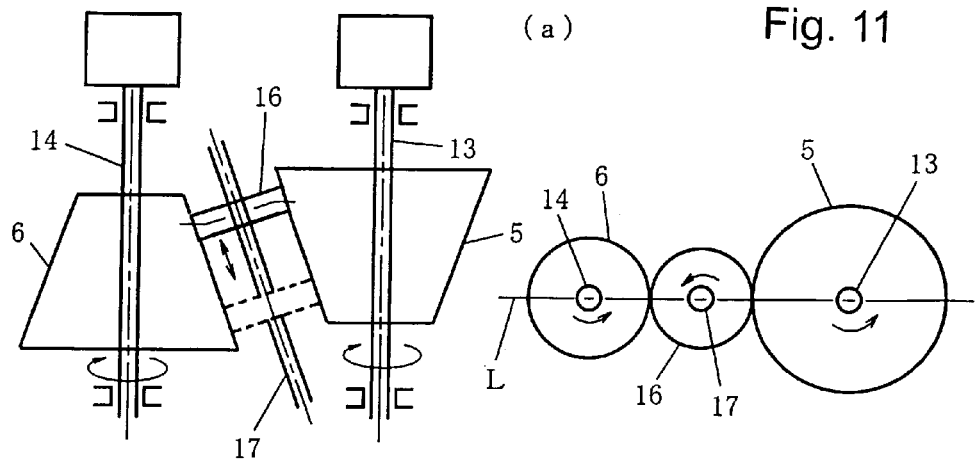
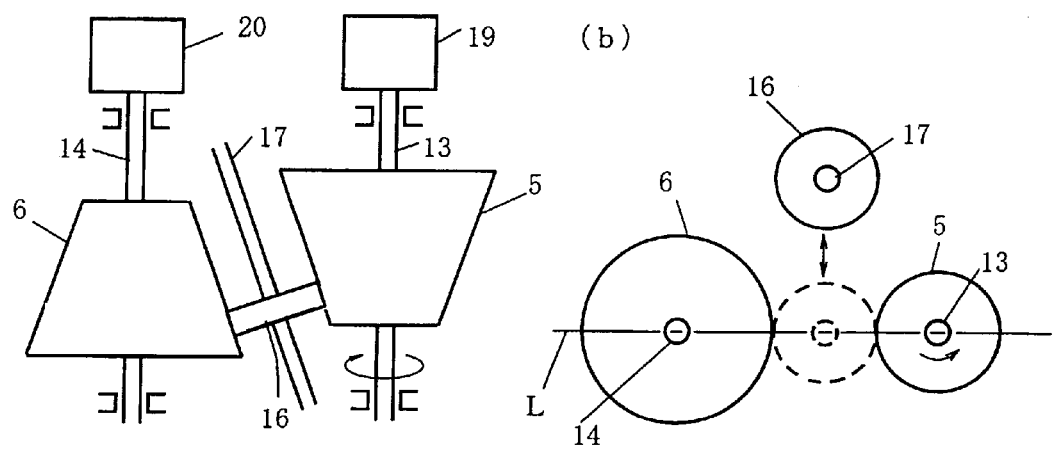
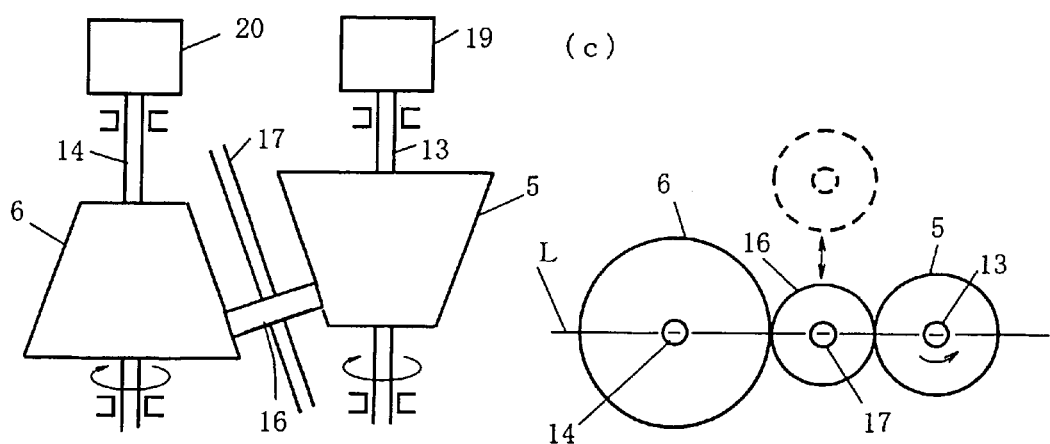
Fig. 11

Fig. 12
(a) 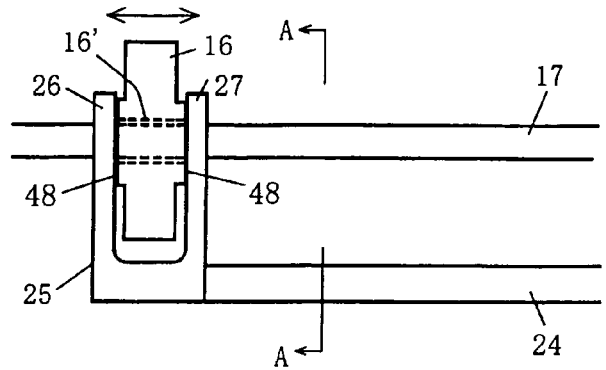 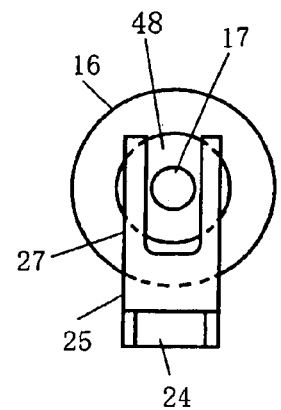
(b) 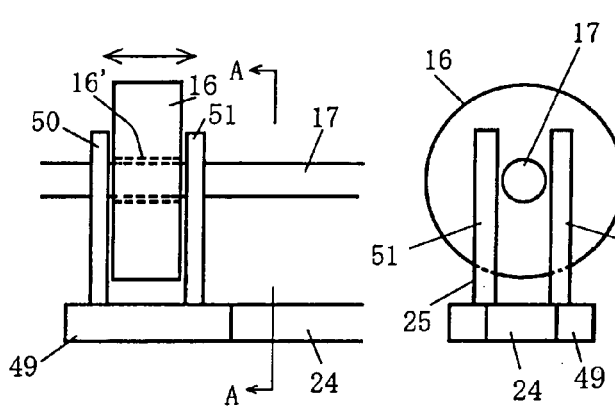 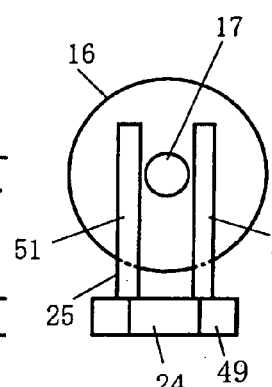 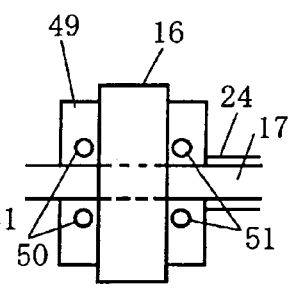
(c) 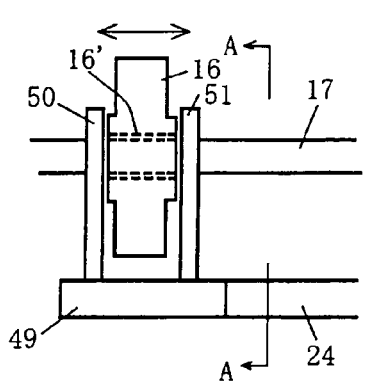 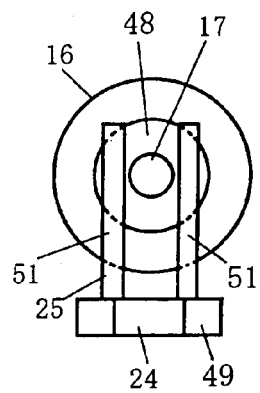 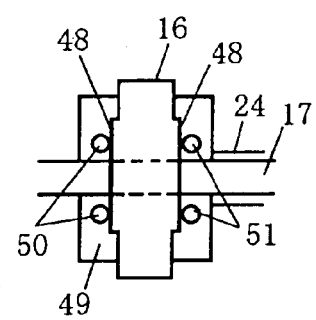

Fig. 13
(a)
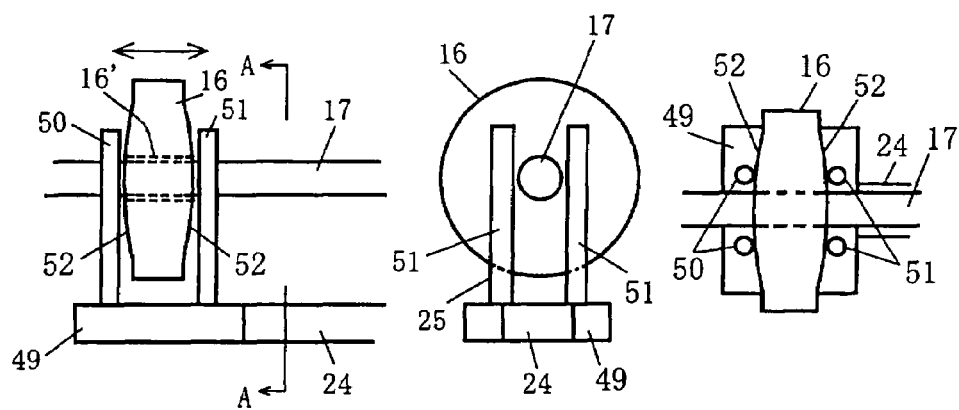
(b)
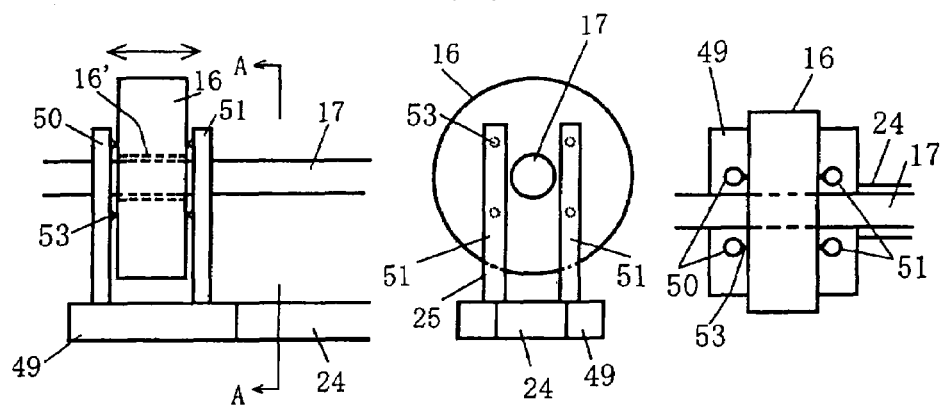
(c)
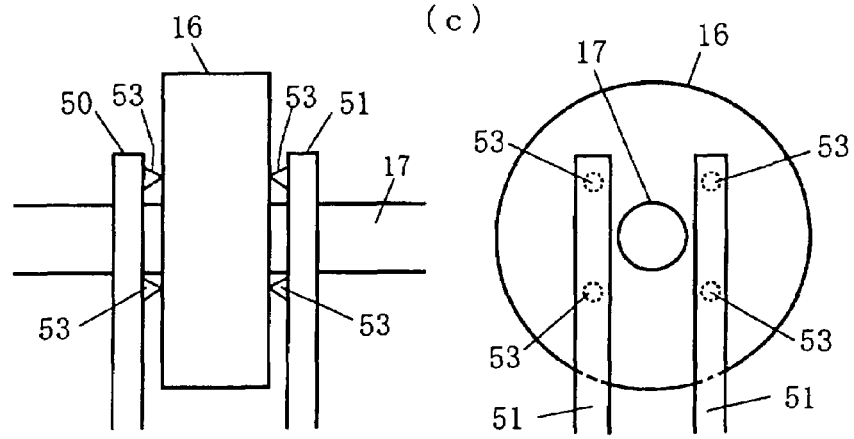

TRANSMISSION

FIELD OF THE INVENTION

The present invention relates to a transmission, and more particularly, to a transmission that continuously varies speed without steps and transmits rotation of a power device in a motor vehicle, etc., to a load end such as wheels.

BACKGROUND OF THE INVENTION

A gear variable speed mechanism that varies speed by gear ratio has been known in the art of a power transmission apparatus. Moreover, a CVT (Continuously Variable Transmission) is known as an apparatus that continuously varies speed of the rotation of a power device without steps (refer to patent document 1).

In CVT, two pulleys, at an output end and a driving end, respectively, are connected by a steel belt attached to a top. It is characterized in that the width of the two pulleys is changed hydraulically and the diameter of the pulley increases as its width increases and the diameter decreases as its width deceases. Thus, the rotation of the driving end is varied and transmitted to the output end. Patent document 1: Patent Publication No. 2001-518171.

PROBLEMS TO BE SOLVED BY THE INVENTION

Since the conventional gear change mechanism noted above is a structure that combines two or more gears, its structure is complicated and its weight also becomes large. In the CVT, since the width of the pulley is changed by oil pressure, its structure inevitably becomes complicated.

Therefore, it is an object of the present invention to solve the problems of the conventional transmission described above and to realize a transmission that has a simple structure and mechanism, and is light-weight and compact.

MEANS TO SOLVE THE PROBLEMS

The transmission of the present invention has a first rotation shaft coaxially fixed to a first turning transmission wheel and a second rotation shaft coaxially fixed to a second turning transmission wheel which are arranged in parallel with each other, a support shaft extended between the first turning transmission wheel and the second turning transmission wheel, an intermediary transfer wheel formed on the support shaft rotatably and movably along a longitudinal direction of the support shaft, wherein the first rotation shaft is rotated by a power device, and a rotational force of which can be transmitted to the second rotation shaft with variable speed. The transmission is characterized in that each of the first turning transmission wheel and the second turning transmission wheel is formed in a shape of a right circular cone or a right circular cone trapezoid and has an identical vertex angle, and a tapered side peripheral surface of each of the first turning transmission wheel and the second turning transmission wheel faces each other with a constant distance, the support shaft is arranged between the side peripheral surface of the first turning transmission wheel and the side peripheral surface of the second turning transmission wheel such that it extends in the longitudinal direction along the side peripheral surface of the first turning transmission wheel and the side peripheral surface of the second turning transmission wheel, and the intermediary transfer wheel contacts with each of the side peripheral surface of the first turning transmission wheel and the side peripheral surface of the second turning transmission wheel and is moveable in the longitudinal direction along the support shaft while maintaining the contact.

The intermediary transfer wheel is movable in the longitudinal direction along the support shaft by means of an intermediary transfer wheel feeding device, and the intermediary transfer wheel feeding device has a moving arm, a drive mechanism that drives the moving arm in the longitudinal direction along the support shaft, and a feeding member provided at an end of the moving arm that moves the intermediary transfer wheel in the longitudinal direction along the support shaft.

The support shaft is moveable by a reciprocal movement mechanism to locations close to or away from the first turning transmission wheel and the second turning transmission wheel, where the intermediary transfer wheel contacts with the first turning transmission wheel and the second turning transmission wheel when the support shaft is located at the close location, and the intermediary transfer wheel is separated from the first turning transmission wheel and the second turning transmission wheel when the support shaft is located at the away location.

EFFECT OF THE INVENTION

According to the transmission of the present invention, as will be explained in detail later, the basic configuration is a very simple structure formed of two turning transmission wheels in the shape of the right circular cone trapezoid and an intermediary transfer wheel which contacts with these two turning transmission wheels, thereby achieving a reliable and inexpensive transmission.

Further, the present invention can easily add a clutch function synergistically and integrally by contacting or releasing the intermediary transfer ring with respect to the two turning transmission wheels. Thus, not only to the transmission, the present invention can apply to many other operations required for running a motor vehicle.

BRIEF DESCRIPTION OF THE DRAWINGS

FIG. 1 is a drawing explaining the components of the basic configuration of the transmission under the present invention.

FIG. 2 is a drawing explaining the components of the basic configuration of the transmission under the present invention.

FIG. 3 is a drawing explaining the basic configuration and its operation of the transmission under the present invention, where the left-hand side drawings (a)-(b) show plan views and the right-hand side drawings show A-A cross sectional views corresponding thereto.

FIG. 4 is a drawing explaining the embodiment 1 of the transmission of the present invention, where the drawing (a) shows an overall top view, the drawing (b) shows the A-A cross sectional view of (a), and the drawing (c) shows a detailed view of the main component of (a).

FIGS. 8 (a) and (b) are drawings explaining the modification example of the clutch mechanism of the embodiment 2, respectively.

FIG. 9 is a drawing explaining the operation under the assumption that the transmission of the embodiment 2 is applied to a drive system (clutch, transmission) of a motor vehicle.

FIG. 10 is a drawing explaining the operation under the assumption that the transmission of the embodiment 2 is applied to a drive system (clutch, transmission) of a motor vehicle.

FIG. 11 is a drawing explaining modification examples of the basic configuration of the transmission under the present invention and their operations, where the left-hand side drawings (a)-(b) show plan views, and their A-A cross sectional views are shown on the right-hand side.

FIGS. 12 (a)-(c) are drawings (components common to that in FIG. 5 are denoted by the same legends) explaining modification examples of the intermediary transfer wheel feeding mechanism of the embodiment 1 (same applies to the embodiment 2), where the drawing (a) shows a front view (left-hand view) and its A-A cross sectional view (right-hand view), and the drawings (b) and (c) show front views (left-hand views), A-A cross sectional views (center view), and plan views (right-hand views).

FIGS. 13 (a) and (b) are drawings (components common to that in FIG. 5 are denoted by the same legends) explaining the modification example of another intermediary transfer wheel feeding mechanism of the embodiment 1 (same applies to the embodiment 2), where front views (left-hand views), A-A cross sectional views (center views) and plan views (right-hand views) are shown, and the drawing (c) is an enlarged view of the main components in the drawing (b).

DESCRIPTION OF LEGENDS

Figure 5:
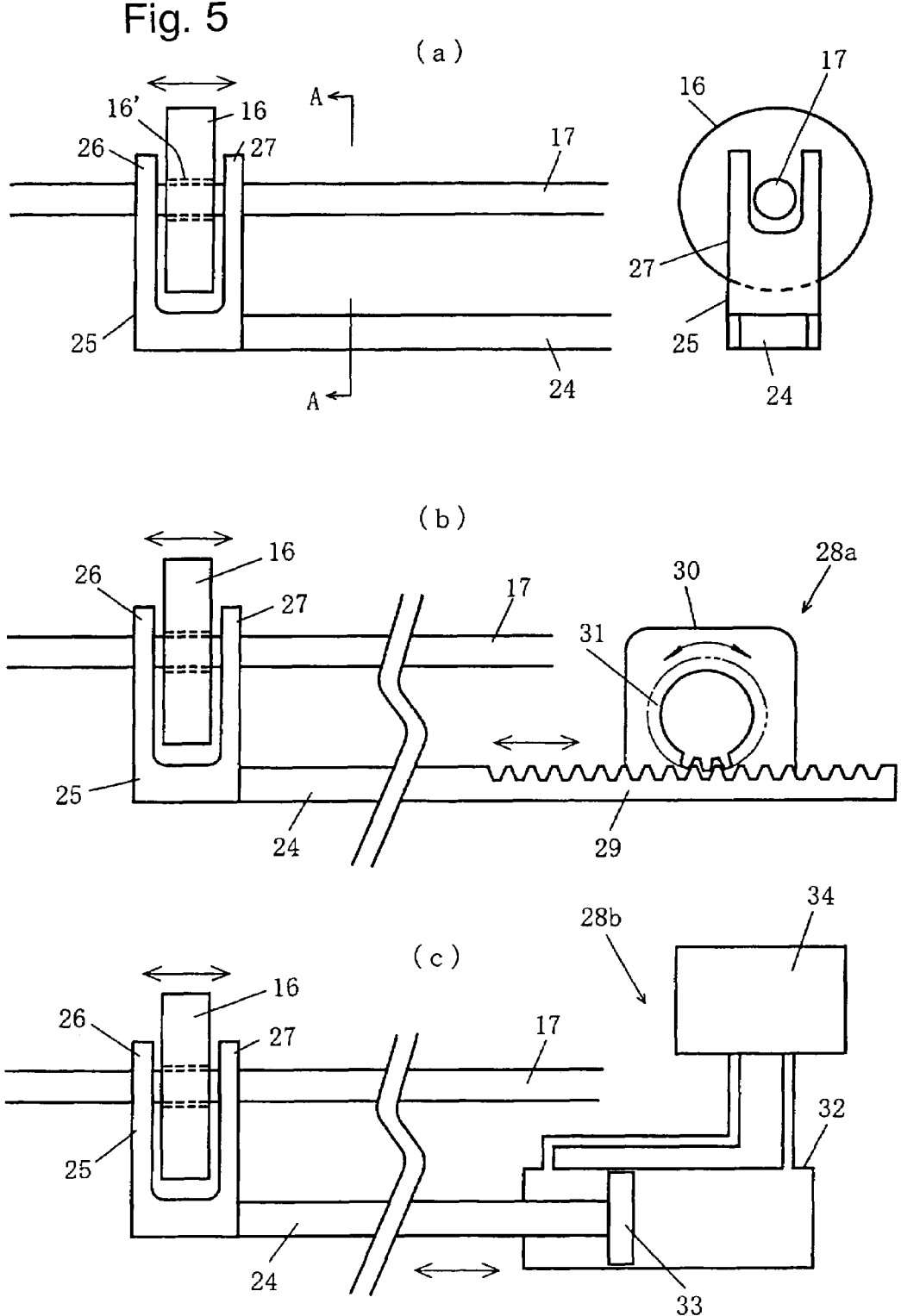
FIG. 5 is a drawing explaining the intermediary transfer wheel feeding mechanism for linearly moving the intermediary transfer ring along a support shaft in the embodiment 1, where the drawing (a) shows a front view (left-hand view) and its A-A cross sectional view (right-hand view) for explaining the relationship between the intermediary transfer wheel and the feeding member, and the drawings (b) and (c) are views for explaining the drive mechanisms, respectively.

1: right circular cone body
2: bottom plane
3: tapered side peripheral surface
4: upper surface of circular cone body
5: first turning transmission wheel
6: second turning transmission wheel
7: bottom plane of the first turning transmission wheel
8: bottom plane of the second turning transmission wheel
9: tapered side peripheral surface of the first turning transmission wheel
10: tapered side peripheral surface of the second turning transmission wheel
11: border line of the first turning transmission wheel
12: border line of the second turning transmission wheel
13: first rotation shaft
14: second rotation shaft
15: bearing
16: intermediary transfer wheel
17: support shaft
18: axis
19: power device
20: load device
21: transmission of embodiment 1
22: frame
23: fixing means
24: moving arm
25: feeding member
26: front feeding piece
27: rear feeding piece
28, 28a, 28b: drive mechanism
29: rack
31: pinion
32: oil pressure cylinder
33: piston
34: oil pressure pump
35: gear ratio control unit
36: transmission of embodiment 2
37: clutch mechanism
38: support member
39: moving arm
40: reciprocal movement mechanism
41: upper rack
42: motor
43: pinion
44: oil pressure cylinder
45: piston
46: oil pressure pump
47: control unit
48: convex surface of intermediary transfer wheel
49: feeding base
50: front contact arm
51: rear contact arm
52: gently sloped surface of intermediary transfer wheel
53: spot-like support C, C': right circular cone body D, D': right circular cone trapezoid body O, O': axes of right circular cone body and right circular cone trapezoid body

BEST MODE FOR IMPLEMENTING THE INVENTION

The best mode for implementing the transmission under the present invention is explained below with reference to the embodiments. First, the basic configuration and operation of the present invention is explained.

(Basic Configuration and its Operation)

The transmission of the present invention has a first turning transmission wheel fixed to a driving shaft, and a second turning transmission wheel fixed to a driven shaft as the main components. The structural requirement for the first turning transmission wheel and the second turning transmission wheel is that each wheel must be a right circular cone or a right circular cone trapezoid having a vertex angle identical to one another.

This will be explained in more detail below. The structural requirement of the first turning transmission wheel and the second turning transmission wheel is that each is a part or a whole of a right circular cone (right circular cone body) having a vertex angle identical to one another. Thus, the first turning transmission wheel and the second turning transmission wheel may be one right circular cone body and another right circular cone body with an equal vertex angle, or a right circular cone body and a part of the right circular cone body (explained later) with an equal vertex angle, regardless of their sizes.

Here, a right circular cone body is the one shown in FIG. 1(a) as a numeral 1 and its axis O crosses a bottom plane 2 vertically at a point C. That is, the right circular cone body is a cone which is formed by rotating a hypotenuse of a right triangle by 360 degrees about the axis O (PC). In this specification, the "vertex angle" is an angle formed by the axis O and a side peripheral surface 3 of the cone body (angle equivalent to the vertex angle of the right triangle) and is indicated by α for the right circular cone body of FIG. 1(a). FIG. 1(b) shows two right circular cone bodies 1 and 1 each having the vertex angle α that is identical to one another.

The "whole of the right circular cone body" means a right circular cone body 1 itself. The "part of the right circular cone body" means a part formed by cutting off the right circular cone body with a plane perpendicular to the axis, which includes a "right circular cone trapezoid portion ("right circular cone trapezoid body") and a "smaller right circular cone body similar to the original right circular cone body".

With reference to FIG. 1(*a*), the meaning of the "right circular cone trapezoid" is a shape that is formed by cutting the right circular cone body 1 by a plane 4 (an upper plane 4 that is parallel with the bottom plane 2), thereby comprised of the bottom plane 2, the upper plane 4, and the side peripheral surface 3 that is tapered (indicated by D in FIG. 1(*a*)). The "smaller right circular cone body similar to the original right circular cone body" is indicated by C in FIG. 1(*a*).

Both embodiments 1 and 2 of the transmission of the present invention that will be described later are explained for the configuration where the first turning transmission wheel and the second turning transmission wheel are the right circular cone trapezoid bodies D. In this configuration, as shown in the solid line in FIG. 1(*b*), the first turning transmission wheel 5 and the second turning transmission wheel 6 having the right circular cone trapezoid shape are arranged apart such that the bottom planes 7 and 8 are facing opposite to each other in the direction of the axes O, O where each axis O is arranged in parallel with each other.

Thus, in the arrangement above, as shown in the plan view of FIG. 1(*c*), the tapered side peripheral surface 9 of the first turning transmission wheel 5 and the tapered side peripheral surface 10 of the second turning transmission wheel 6 are parallel at border lines 11 and 12 (the borders lines of the first turning transmission wheel 5 and the second turning transmission wheel 6 as viewed two dimensionally) facing one another, where a distance d therebetween is constant.

FIGS. 1(*d*) and 1(*e*) show another embodiment where a "part of the right circular cone body" is used as the first turning transmission wheel and the second turning transmission wheel under the present invention. FIG. 1(*d*) is an example where a "part of the right circular cone body C" and a "right circular cone trapezoid body D" are used. FIG. 1(*e*) is an example where two right circular cone trapezoid bodies D and D' are used each of which is a part of a right circular cone body having an equal vertex angle a but different parts are taken off.

When the whole of the right circular cone bodies having an identical vertex angle with each other are to be used for the first turning transmission wheel and the second turning transmission wheel, the right circular cone bodies 1 shown in FIG. 1(*a*) may be used without change which are arranged in the direction opposite to one another (condition wherein the dotted-line section in FIG. 1(*d*) is included) as the first turning transmission wheel and the second turning transmission wheel in the transmission of the present invention.

FIG. 1 shows an example wherein a part or a whole of two right circular cone bodies having the equal vertex angle α are used. In contrast, FIG. 2 is a view that explains an example where a part or a whole of two right circular cone bodies 1 and 1' having the equal vertex angle α but with different size (similar figure) as shown in FIG. 2(*a*) are used. Since it is basically identical to that of FIG. 1, the same legends are used and is explained briefly.

The right circular cone trapezoid bodies D and D' that are part of the right circular cone bodies 1 and 1' shown in FIG. 2(*a*) are arranged such that the axes O and O' of the first turning transmission wheel 5 and the second turning transmission wheel 6 are parallel with each other. By this arrangement, the first turning transmission wheel 5 and the second turning transmission wheel 6 are aligned with a constant distance d similar to FIG. 1(*c*).

FIG. 2(*c*) shows an example where a part (right circular cone body C) and a whole (right circular cone body C') of the right circular cone bodies 1 and 1' having a similar shape to one another are used. FIG. 2(*d*) shows an example where a part (right circular cone trapezoid body D) and a whole (right circular cone body C') of the right circular cone bodies 1 and 1' having a similar shape to one another are used.

As described above, as for the configurations of the first turning transmission wheel and the second turning transmission wheel, various kinds of modes may be used as long as parts or wholes of right circular cone bodies having an equal vertex angle are used. As a result, the variable speed range is increased based on the purpose of the transmission system to the extent that would have been impossible in the conventional transmission. In the following for both the embodiments 1 and 2, explanation is made for the configuration using right circular cone trapezoid bodies.

In practice, as shown in FIG. 3(*a*), the first turning transmission wheel 5 is coaxially fixed to a first rotation shaft 13, the second turning transmission wheel 6 is coaxially fixed to a second rotation shaft 14, and the first rotation shaft 13 and the second rotation shaft 14 are arranged in parallel with each other. The first rotation shaft 13 and the second rotation shaft 14 are parallel with each other, and each of which is rotatably attached to a frame (not shown) through bearings 15.

Between the tapered side peripheral surface 9 of the first turning transmission wheel 5 and the tapered side peripheral surface 10 of the second turning transmission wheel 6, the intermediary transfer wheel 16 is arranged as shown in FIG. 3(*a*). This intermediary transfer wheel 16 is rotatably attached to a support shaft 17.

As shown in FIG. 3(*a*), the support shaft 17 is arranged between the border line 11 of the side peripheral surface 9 of the first turning transmission wheel 5 and the border line 12 of the side peripheral surface 10 of the second turning transmission wheel 6, and is arranged so that it extends along the longitudinal direction of these border lines. Both ends of the support shaft 17 are fixedly attached to the frame (not shown).

As described above, the intermediary transfer wheel 16 is rotatable about the support shaft 17. By pressing the intermediary transfer wheel 16, for example, the intermediary transfer wheel 16 is able to linearly move along the longitudinal direction of the support shaft 17 (the direction of an axis 18). The axis 18 of the support shaft 17 is linearly extended with a fixed angle β as shown in FIG. 3(*a*) relative to an axis of the first rotation shaft 13 (similarly, relative to the second rotation shaft 14 that is parallel with the first rotation shaft 13).

Between the side peripheral surface 9 of the first turning transmission wheel 5 and the side peripheral surface 10 of the second turning transmission wheel 6, the support shaft 17 is arranged such that wherever the position along the longitudinal direction of the support shaft 17 that the intermediary transfer wheel 16 moves, the outer perimeter surface of the intermediary transfer wheel 16 contacts with both the side peripheral surface 9 of the first turning transmission wheel 5 and the side peripheral surface 10 of the second turning transmission wheel 6, and that the rotation (turning power) of the first turning transmission wheel 5 can be transferred to the second turning transmission wheel 6.

As described above, wherever the position along the longitudinal direction of the support shaft 17 that the intermediary transfer wheel 16 moves, the outer perimeter surface of the intermediary transfer wheel 16 is arranged to contact with both the side peripheral surface 9 of the first turning transmission wheel 5 and the side peripheral surface 10 of the second turning transmission wheel 6. As shown as the imaginary lines p and q in FIG. 3(b), the straight lines p and q that are obtained by connecting the peripheral surface of the intermediary transfer wheel 16 to the side peripheral surface 9 of the first turning transmission wheel 5 and the side peripheral surface 10 of the second turning transmission wheel 6 at their contact points (due to the thickness of the intermediary transfer wheel 16, the contact area in practice is a tangential line) are parallel with one another.

The first turning transmission wheel 5, the second turning transmission wheel 6, and the intermediary transfer wheel 16 are made of steel, etc. The surface roughness is formed in such a way that the outer peripheral surface of the intermediary transfer wheel 16 contacts with the side peripheral surfaces 9 and 10 of the first turning transmission wheel 5 and the second turning transmission wheel 6 to allow frictional transfer while it can move in the longitudinal direction along the support shaft 17 in maintaining the contact. Surface treatment may be applied to the side peripheral surfaces 9 and 10 of the first turning transmission wheel 5 and the second turning transmission wheel 6, and the outer perimeter surface of the intermediary transfer wheel 16 to increase the hardness of the contacting surfaces. Depending on the situation, the first turning transmission wheel 5, the second turning transmission wheel 6, and the intermediary transfer wheel 16 may have coatings such as by rubber or plastic on the side peripheral surfaces 9, 10 and the outer peripheral surface.

The intermediary transfer wheel 16 contacts with the side peripheral surface 9 of the first turning transmission wheel 5 and the side peripheral surface 10 of the second turning transmission wheel 6. The extent to which the contact is made is such that the rotation of the first turning transmission wheel 5 can be transferred to the second turning transmission wheel 6 by the friction through the intermediary transfer wheel 16, and the intermediary transfer wheel 16 can move, when being pressed, in the longitudinal direction along the support shaft 17.

This point is similar to the conventional CVT in the fact that the a problem will not arise even when the steal belt is moved on the pulley's diameter direction while contacting the groove surface of the pulley by changing the width of the pulley while power is transmitted. The peripheral surface of the intermediary transfer wheel 16 is movable in the longitudinal direction along the support shaft 17, while maintaining the contact with the side peripheral surface 9 of the first turning transmission wheel 5 and the side peripheral surface 10 of the second turning transmission wheel 6.

The first rotation shaft 13 is connected to a power device 19 such as an engine or a motor, and thus, the first rotation shaft 13 and the first turning transmission wheel 5 constitute a power supply side. The second rotation shaft 14 is connected to an apparatus that is a load (this is hereafter referred to a "load device", e.g., driving wheels in the case of a vehicle), and thus, the second rotation shaft 14 and the second turning transmission wheel 6 constitute a load side.

The operation under the above-described configuration is explained. When the first rotation shaft 13 is connected to the power device 19 such as an engine or a motor and is rotated by the power device 19, then the first turning transmission wheel 5 will rotate. This rotational force results in the rotation of the intermediary transfer wheel 16 by the friction at the contacting surface of the outer peripheral surface of the intermediary transfer wheel 16 and the side peripheral surface 9 of the first turning transmission wheel 5. Since the peripheral surface of the intermediary transfer wheel 16 contacts with the side peripheral surface 10 of the second turning transmission wheel 6, the rotational force of the intermediary transfer wheel 16 is transmitted to the second turning transmission wheel 6, thereby rotating the second turning transmission wheel 6 and the second rotation shaft 14 by the friction.

The intermediary transfer wheel 16 is supported by the support shaft 17, and is movable in the longitudinal direction. Thus, depending on the location moved thereto, the rotation of the first turning transmission wheel 5 can be transferred to the second turning transmission wheel 6 with a different rotation rate although the rotational direction remain the same. Namely, it is possible to change the gear ratio.

A general formula of the gear ratio of the transmission under the present invention is as follows. Referring to the drawings at right and left sides of FIG. 3(a), where a radius of the side peripheral surface 9 of the first turning transmission wheel 5 is R1, a radius of the side peripheral surface 10 of the second turning transmission wheel 6 is R2, a rotational frequency of the first turning transmission wheel 5 is N1, and a rotational frequency of the second turning transmission wheel 6 is N2, then a ratio between the rotational frequency N1 of the first turning transmission wheel 5 and the rotational frequency N2 of the second turning transmission wheel 6 (N2/N1. referred to as "gear ratio") is expressed by the following formula (1).

$$N2/N1 = R1/R2 \ldots \quad (1)$$

FIG. 3(b) shows the condition where the peripheral surface of the intermediary transfer wheel 16 contacts with the side perimeter surface 9 of the first turning transmission wheel 5 at a location with the minimum diameter, and it contacts with the side perimeter surface 10 of the first turning transmission wheel 6 at a location with the maximum diameter. The gear ratio in this condition is expressed as follows:

$$N2/N1 = R1\min/R2\max$$

Since R1min<R2max in this condition, N2<N1 is obtained. The rotational frequency from the power supply side becomes low at the load side, that is, deceleration occurs. Moreover, the value of N1×(R1min/R2max)=N2 becomes minimum (N2min).

FIG. 3(c) shows the condition where the peripheral surface of the intermediary transfer wheel 16 contacts with the side perimeter 9 of the first turning transmission wheel 5 at a location with the maximum diameter, and it contacts with the side perimeter surface 10 of the second turning transmission wheel 6 at a location with the minimum diameter. The gear ratio in this condition is expressed as follows:

$$N2/N1 = R1\max/R2\min$$

Since R1max>R2min in this condition, N2>N1 is obtained. The rotational frequency from the power supply side becomes high at the load side, that is, acceleration occurs. Moreover, the value of N1×(R1 max/R2min)=N2 becomes maximum (N2min).

Therefore, by an operation such as pressing the intermediary transfer wheel 16 in the longitudinal direction along the support shaft 17 to move to any position between the positions shown in FIG. 3(b) and FIG. 3(c), the rotational frequency N1 at the power supply side can be varied at the load side without steps in the range between the minimum and maximum of the rotational frequency N2.

EMBODIMENT 1

FIGS. 4 and 5 are drawings describing the embodiment 1 of the transmission under the present invention. FIG. 4 is a plan view of the transmission 21 in the embodiment 1. For convenience of explanation, an upper part of FIG. 4 is denoted as front and a lower part of FIG. 4 is denoted as rear. In this transmission 21, as shown in FIG. 4, the first turning transmission wheel 5 is coaxially fixed to the first rotation shaft 13, and the second turning transmission wheel 6 is coaxially fixed to the second rotation shaft 14, and the first rotation shaft 13 and the second rotation shaft 14 are arranged in a frame 22 in such a way that they extend in a front-rear direction in parallel with each other.

The first turning transmission wheel 5 and the second turning transmission wheel 6 are right circular cone trapezoids (refer to FIG. 1) of the same shape and size with one another, and are arranged so that the respective axes O-O' are in parallel with one another.

The tapered side peripheral surface 9 of the first turning transmission wheel 5 and the tapered side peripheral surface 10 of the second turning transmission wheel 6 are faced with each other with a constant distance d, and are arranged such that the border lines 11 and 12 of the tapered side peripheral surfaces 9 and 10 are parallel with each other.

A rear end of the first rotation shaft 13 is attached to the frame 22 in a rotatable manner through the bearing 15, and a front end of the first rotation shaft 13 is attached to the frame 22 in a rotatable manner through the bearing 15 and is further extended to the outside of the frame 22 as an input shaft and is connected to the power device 19 such as an engine or a motor.

A front end of the second rotation shaft 14 is attached to the frame 22 rotatably through the bearing 15, and a rear end of the second rotation shaft 14 is attached to the frame 22 rotatably through the bearing 15 and is further extended to the outside of the frame 22 as an output shaft and is connected to the load device 20 (e.g. driving wheels of a motor vehicle).

As shown in FIG. 4, between the border line 11 of the side peripheral surface 9 of the first turning transmission wheel 5 and the border line 12 of the side peripheral surface 10 of the second turning transmission wheel 6, the support shaft 17 that is arranged in the longitudinal direction of the these border lines 11 and 12 as they extend is fixed to the frame 22 at both its front and back ends through fixing means 23.

The intermediary transfer wheel 16 is mounted on the support shaft 17 in such a way that the intermediary transfer wheel 16 is rotatable and moveable in the longitudinal direction of the support shaft 17 when pressed toward the front-rear direction. Between the side peripheral surface 9 of the first turning transmission wheel 5 and the side peripheral surface 10 of the second turning transmission wheel 6, the support shaft 17 is arranged such that the outer peripheral surface of the intermediary transfer wheel 16 contacts with both the side peripheral surface 9 of first turning transmission wheel 5 and the side peripheral surface 10 of the second turning transmission wheel 6 wherever the intermediary transfer wheel 16 is located along the longitudinal direction of the support shaft 17, thereby transferring the rotation (force) to the second turning transmission wheel 6.

An intermediary transfer wheel feeding mechanism for moving the intermediary transfer wheel 16 to the front and rear along the support shaft 17 is explained in the following. The support shaft 17 is inserted into a center hole 16' (refer to FIG. 5(a)). of the intermediary transfer wheel 16 and attached thereto such that intermediary transfer wheel 16 can rotate and move along the longitudinal direction of the support shaft 17.

As shown in FIGS. 4(a), (c) and FIGS. 5(a)-(c), a feeding member 25 is formed at an end of a moving arm 24. The feeding member 25 has a front feeding piece 26 and a rear feeding piece 27 which respectively face a front surface and a rear surface of the intermediary transfer wheel 16. A small gap s is formed between the front surface and the rear surface of the intermediary transfer wheel 16 and the front feeding piece 26 and the rear feeding piece 27 so that smooth rotation is achieved by decreasing friction with the front feeding piece 26 and the rear feeding piece 27 upon the rotation of the intermediary transfer wheel 16.

The moving arm 24 is arranged at the bottom of the support shaft 17 along the support shaft 17, and its base end is connected to a drive mechanism 28 that drives the moving arm 24 back-and-forth along the support shaft 17. The drive mechanism 28 can take any mechanism as long as it can drive the moving arm 24 linearly back-and-forth. Such an example is shown in FIGS. 5(b) and (c).

FIG. 5(b) shows a drive mechanism 28a which is composed of a rack 29 at the base end of the moving arm 24 where a pinion 31 connected to an output shaft of a motor 30 is engaged with the rack 29. FIG. 5(c) shows a drive mechanism 28b which is configured by the moving arm 24 where the base end of the moving arm 24 is a piston 33 of a oil pressure cylinder 32. The oil pressure cylinder 32 is movable in a right-left direction by oil supplied from an oil pressure pump 34.

In addition, although not shown, a screw type linear drive mechanism may also be used where the moving arm 24 is arranged so that it will not rotate about its axis, whose base end is provided with a screw that is engaged with a screw formed on an output shaft of the motor.

The drive mechanism 28 is connected to a control unit 35. The control unit 35 receives power information that indicates the operating condition of the power device 19 and load information (as necessary, such as desired operation selection information by a user as well) fed back from the load device 20, and controls the drive mechanism 28, so that a desired rotational frequency is obtained from the second rotation shaft 14.

The control unit utilizes a microcomputer having a CPU, an I/O device, and a storage device, etc. When the power information and the load information described above are input, the control unit generates a control signal to control the drive mechanism 28 based on a program pre-stored in the storage medium.

The operation of the transmission 21 configured as described above is explained. As the power device 19 starts the operation, the first rotation shaft 13 and the first turning transmission wheel 5 rotate, and further the second turning transmission wheel 6 and the second rotation shaft 14 rotate through the intermediary transfer wheel 16.

In this case, in FIG. 4, when the intermediary transfer wheel 16 is in the location indicated by the continuous lines, the radius R1 of the first turning transmission wheel 5 at the location where the outer peripheral surface of the intermediary transfer wheel 16 contacts with the side peripheral surface 9 of the first turning transmission wheel 5 (hereafter, referred to as "first turning transmission wheel 5") is smaller than the radius R2 of the second turning transmission wheel 6 at the location where the intermediary transfer wheel 16 contacts with the side peripheral surface 10 of the second turning transmission wheel 6 (hereafter, referred to as "second turning transmission wheel 6"). Thus, deceleration occurs based on the equation (1).

When the moving arm 24 and the feeding member 25 are moved forward by the drive mechanism 28 and the rear feeding piece 27 contacts with the rear surface of the intermediary transfer wheel 16 such that the intermediary transfer wheel 16 is moved to the position indicated by the dotted lines, the radius R1 of the first turning transmission wheel 5 at the location where the intermediary transfer wheel 16 contacts with the first turning transmission wheel 5 is larger than the radius R2 of the second turning transmission wheel 6 at the location where the outer peripheral surface of the intermediary transfer wheel 16 contacts with the second turning transmission wheel 6. Thus, acceleration occurs based on the equation (1).

In this manner, by selecting the location of the intermediary transfer wheel 16 by the intermediary transfer wheel feeding device between the locations indicated the continuous-lines and dotted lines, the gear ratio can be changed without steps based on the equation (1), and the rotational output with a desired rotational frequency can be obtained from the second rotation shaft 14.

EMBODIMENT 2

The embodiment 2 of the transmission under the present invention is explained with reference to FIGS. 6-10. Since the transmission 36 in the embodiment 2 is almost identical as a whole to the transmission 21 in the embodiment 1, the same reference legends are used for the same components and the explanation on the same components is omitted. Because the characteristic configuration of the embodiment 2 that is different from that of the embodiment 1 is to have a clutch mechanism, thus, the embodiment 2 is explained focusing on this clutch mechanism.

A clutch mechanism 37 that is a feature of the embodiment 2 is a structure that enables the outer peripheral surface of the intermediary transfer wheel 16 to contact with the side peripheral surface 9 of the first turning transmission wheel 5 and the side peripheral surface 10 of the second turning transmission wheel 6, as well as to release the contact from the side peripheral surface 9 of the first turning transmission wheel 5 (hereafter, explained simply as "first turning transmission wheel 5") or the side peripheral surface 10 of the second turning transmission wheel 6 (hereafter, explained simply as "second turning transmission wheel 6") , and to selectively perform the contact state or the release state. A specific structure is explained as follows.

The clutch mechanism 37 is equipped with a support member 38 in the shape of a hanger that can reciprocally move in an up-down direction. The support shaft 17 which rotatably supports the intermediary transfer wheel 16 is formed as a part of the support member 38. A movable arm 39 that can extend upward is formed on the support member 38 and a reciprocal movement mechanism 40 is established at the end of this movable arm 39.

Figure 7:
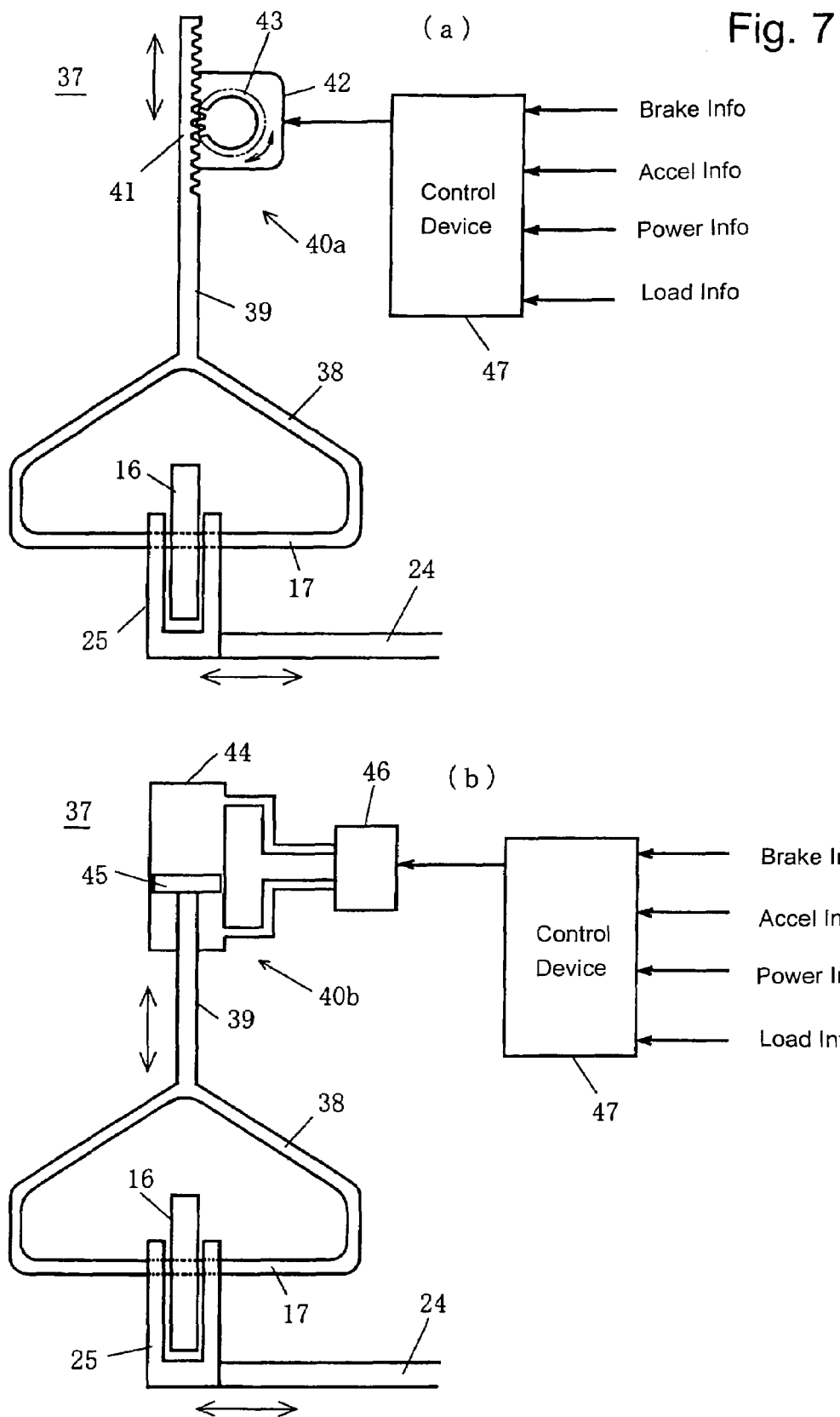
FIGS. 7 (a) and (b) are drawings explaining the clutch mechanism of the embodiment 2, respectively.

An example of the reciprocal movement mechanism 40 is shown in FIG. 7. FIG. 7(*a*) shows a reciprocal movement mechanism 40*a* which is composed of a rack 41 formed at the top of the moving arm 39, a pinion 43 formed at an output shaft of a motor 42 that acts as a driving source, where the rack 41 and the pinion 43 engage with each other.

FIG. 7(*b*) shows a reciprocal movement mechanism 40*b* where an upper end of the movable arm 39 has a piston 45 that performs reciprocal movements in an oil pressure cylinder 448 by means of an oil pressure pump 46 that acts as an oil pressure driving source.

Figure 6:
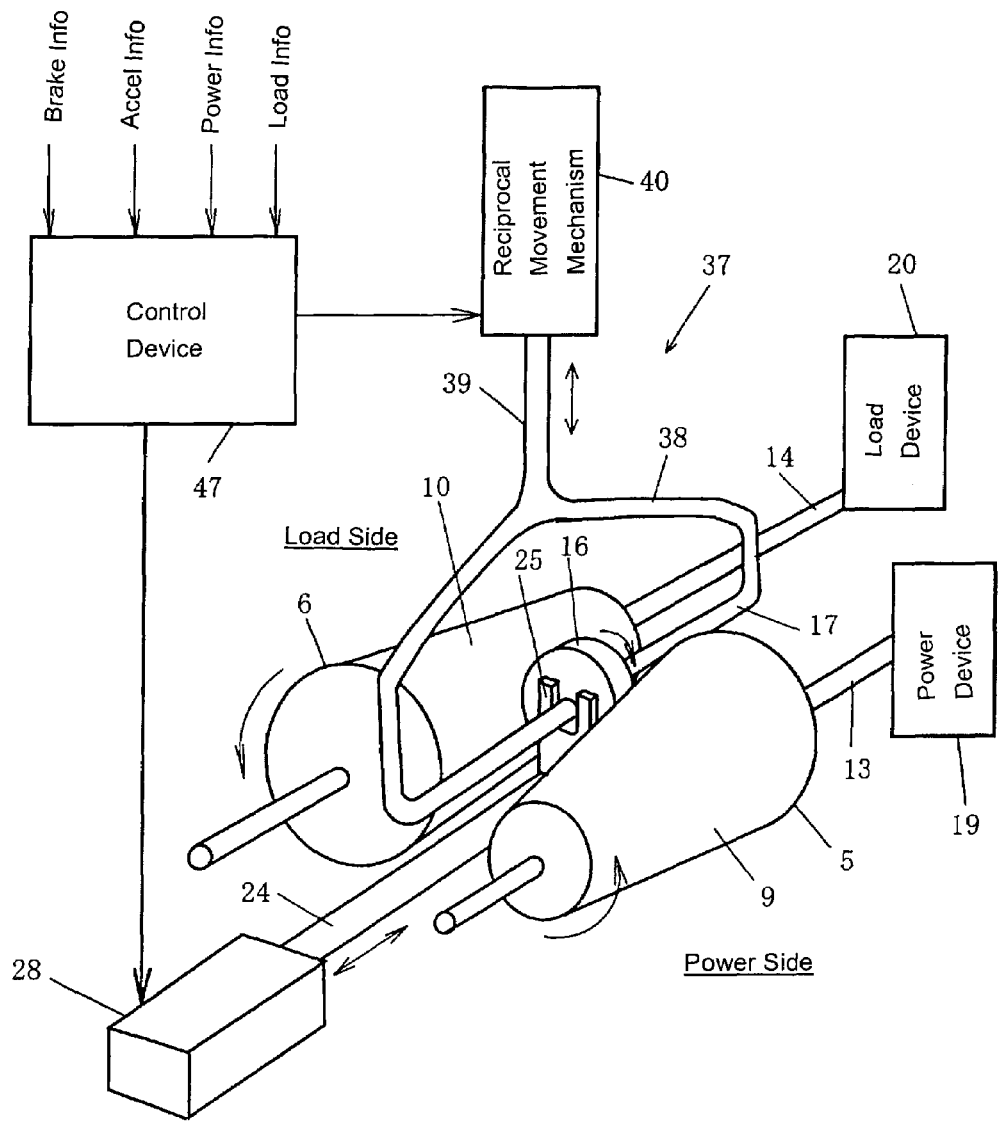
FIG. 6 is a perspective view explaining the overall configuration of the embodiment 2 of the transmission under the present invention.

In FIGS. 6, 7 (*a*) and 7(*b*), the drive mechanism 28 and the reciprocal movement mechanism 40 are configured such that they are controlled by a control device 47. Namely, the motor 30 of the drive mechanism 28*a* or the oil pressure pump 34 is controlled by the control device 47, and the motor 42 of the reciprocal movement mechanism 40 or the oil pressure pump 43 is further controlled by the control device 47.

For example, when the transmission 36 in the embodiment 2 is applied to a drive system of a vehicle as will be described later, brake information (a signal indicating control condition of the brake), accelerator information (a signal indicating acceleration condition by the accelerator), power information (a signal indicating the operational condition of the power system), and load information (a signal indicating the magnitude of the load), etc. are input to the control device 47. The control device 47 is able to control the drive mechanism 28 or the reciprocal movement mechanism 40 based on the condition of these signals.

The control device utilizes a microcomputer incorporating a CPU, an I/O device, and storage device, etc., and when the brake information, acceleration information, power information and load information described above are input, based on the program stored in the storage device, the control device generates a control signal to control the drive mechanism 28 and the reciprocal movement mechanism 40.

(Modification of Embodiment 2)

FIG. 8 shows the clutch device of the embodiment 2, and more particularly, a modification of the support member 38. In the modification shown in FIG. 8(*a*), a perpendicular movable arm 39 is formed at the end of the support shaft 17, and a rack 41 is formed at the perpendicular movable arm 39. Meanwhile, a pinion 43 is formed on an output shaft of the motor 42, and the rack 41 and the pinion 43 engage with each other to move up and down the movable arm 39.

The modification shown in FIG. 8(*b*) is the reciprocal movement mechanism 40 where the lower end of the moveable arm 39 has a configuration that has a piston 45 that can reciprocally move in an oil pressure cylinder 44 by an oil pressure pump 46 that acts as an oil pressure power source. The operation of the motor 42 and the oil pressure pump 46 in the modification shown in FIGS. 8(*a*) and (*b*) are controlled by the control device 47 as explained with respect to the embodiment 2.

The operation of the embodiment 2 configured as above is explained. The rotation of the first rotation shaft 13 and the first rotation transmission wheel 5 is transferred to the second turning transmission wheel 6 and the second rotation shaft 14 via the intermediary transfer wheel 16, thereby rotating the load side.

For changing the gear ratio, for example, from the condition shown in FIG. 6, the moving arm 24 and the feeding member 25 are moved linearly along the support shaft 17 by operating the drive mechanism 28. Consequently, the intermediary transfer wheel 16 is moved linearly along the support shaft 17 by the feeding member 25, the contact location of the intermediary transfer wheel 16 with the first turning transmission wheel 5 and the second turning transmission wheel 6 is changed. Thus, the gear ratio can be changed similar to the embodiment 1.

For example, by means of the drive mechanism 28, after moving the intermediary transfer wheel 16 to the front side in FIG. 6 along the support shaft 17 by the moving arm 24 and the feeding piece 25, the reciprocal movement mechanism 40 is operated. Since the peripheral surface of the intermediary transfer wheel 16 can contact with the small diameter portion of the first turning transmission wheel 5 and the peripheral surface of the intermediary transfer wheel 16 can contact with the large diameter of the second turning transmission wheel 6, the gear ratio can be changed into a deceleration mode.

When the original power device is stopped or in an idling state, by operating the clutch mechanism, the contact of outer peripheral surface of the intermediary transfer wheel 16 with the first turning transmission wheel 5 and the second turning transmission wheel 6 is released (declutched). When the rotation of the first turning transmission wheel 5 is transmitted to the second turning transmission wheel 6, the reciprocal movement mechanism 40 of the clutch mechanism is operated so that the support arm 39 is moved downward, and the peripheral surface of the intermediary transfer wheel 16 is made to contact with the first turning transmission wheel 5 and the second turning transmission wheel 6.

FIGS. 9 and 10 explain the application where the transmission 36 in the embodiment 2 is used as a drive system (clutch and transmission device) of a vehicle, the clutch operation is controlled by the control device and the gear ratio is changed without steps by the control device based on the operational condition of the vehicle.

When the transmission in the embodiment 2 is used for a vehicle, the basic control operation of the control device 47 is set as follows. Regardless of whether the accelerator (pedal) of an motor vehicle is stepped on, the control device 47 controls the reciprocal movement mechanism 40 such that the outer perimeter surface of the intermediary transfer wheel ring 16 contacts with the first turning transmission wheel 5 and the second turning transmission wheel 6. Consequently, the rotational force of the power device 19 is transmitted to the driving wheels that correspond to the load device 20. This condition is equivalent to the condition where the clutch has been turned on (the condition not declutched).

When the brake (pedal) of the motor vehicle is stepped on, the control device 47 receives a brake step-on signal as the brake information, and the control device 47 controls the reciprocal movement mechanism 40 to move the support member 38 upward so that the contact of the outer perimeter surface of the intermediary transfer wheel 16 is released from the first turning transmission wheel 5 and the second turning transmission wheel 6. Thus, the rotational power of the power device 19 is cut off and is not transmitted to the driving wheel that corresponds to the load device 20. This condition is equivalent to the declutched condition. Each operational condition is explained under the premise where the control device 47 is set as described above.

(1) Break is Stepped on and Vehicle is Stationary (refer to FIG. 9(a))

In the condition where the brake is stepped on and the vehicle is stationary, a brake step-on signal (control signal) is input to the control device 47 as the brake information. The control device 47 controls the reciprocal movement mechanism 40. The reciprocal movement mechanism 40 drives the movable arm 39 and the support member 38 so that the contact of the outer perimeter surface of the intermediary transfer wheel 16 is released from the first turning transmission wheel 5 and the second turning transmission wheel 6 (declutched condition). At the same time, the control device 47 controls the drive mechanism 28 and moves the intermediary transfer wheel 16 along the support shaft 17 to the location where the gear ratio becomes the minimum by means of the moving arm 24 and the feeding member 25.

(2) Start Driving (load start up) (refer to FIG. 9(b))

When the step-on of the brake is released for driving, the control device 47 controls the reciprocal movement mechanism 40 at the location where the gear ratio is minimum and moves the support member 38 downward so that the peripheral surface of the intermediary transfer wheel 16 contacts with the first turning transmission wheel 5 and the second turning transmission wheel 6 such that power can be transmitted (the clutch is turned on). When the accelerator is stepped on, depending on the degree of the step-on, the rotational force of the power device 19 increases (rotational frequency increases), and this rotation is transmitted to the driving wheels that correspond to the load device 20, and driving will start.

(3) Acceleration (refer to FIG. 9(c))

If the accelerator is stepped on further, in the condition that the clutch has been turned on, the control device 47 controls the drive mechanism 28 to move the intermediary transfer wheel 16 forward (the upper area in the left drawing in FIG. 9(c)) by means of the moving arm 24 and the feeding member 25 so that the gear ratio will gradually increase without steps to accelerate.

(4) Travel Speed is Maximum (refer to FIG. 10(a))

When the accelerator is stepped on to the maximum, the gear ratio (N2/N1) of the intermediary transfer wheel 16 becomes maximum by the operation similar to that described above (3), and the driving wheel that corresponds to the load device 20 will rotate at the maximum speed.

(5) Brake Step-on While Driving (refer to FIG. 10(b))

When the brake is stepped on during the driving, the control device 47 controls the operation of the support member 38 so that the outer peripheral surface of the intermediary transfer wheel 16 will be separated from the first turning transmission wheel 5 and the second turning transmission wheel 6, thus the contact condition is released (declutched condition). At the same time, the control device 47 controls the drive mechanism 28 to move the intermediary transfer wheel 16 by the moving arm 24 and the feeding member 25 to the location that is most suited to the rotational frequency of the load at each instance. When the load side is to be stopped, the intermediary transfer wheel 16 is moved to the location where gear ratio becomes the minimum.

(6) Acceleration (refer to FIG. 10(c))

Here, when the step-on of the brake is released, the outer peripheral surface of the intermediary transfer wheel 16 will contact again with the first turning transmission wheel 5 and the second turning transmission wheel 6 (clutched condition), and depending on the degree of the step-on of the accelerator and the rotational frequency of the load end, the control device 47 will control the drive mechanism 28 to move the intermediary transfer wheel 16 forward by means of the moving arm 24 and the feeding member 25 to obtain a predetermined gear ratio. In this condition, the rotational force of the power device 19 is transmitted to the driving wheels that correspond to the load device 20.

As described above, although the best mode to implement the invention of the transmission under the present invention is explained based on the embodiments. However, the present invention is not limited to those embodiments, and many other embodiments are possible under the purview of the appended claims. An example of modification is now described in the following where a part of the embodiments 1 and 2 has a different configuration.

In the examples described in the foregoing, as shown in FIGS. 3, 4, 9 and 10, the intermediary transfer wheel 16 is made to establish contact by being placed from the above between the first turning transmission wheel 5 and the second turning transmission wheel 6. However, other configuration is possible as well. As shown in FIGS. 11(a)-(c), the intermediary transfer wheel 16 may be positioned between the first turning transmission wheel 5 and the second turning transmission wheel 6 in such a way that the axis of the intermediary transfer wheel 16 may be located on the straight line L that connects the axes of both the first turning transmission wheel 5 and the second turning transmission wheel 6.

Specifically, the support shaft 17 of the intermediary transfer wheel 16, the first rotation shaft 13 that is fixed with the first turning transmission wheel 5, and the second rotation shaft 14 that is fixed with the second turning transmission wheel 6 transmission (to be precise, their axes are arranged on a straight line (line L in the drawing).

FIG. 11(a) shows the modification of the embodiment 1 shown in FIG. 3 and FIG. 4(b), and shows the condition where the intermediary transfer wheel 16 is located between the first turning transmission wheel 5 and the second turning transmission wheel 6, and the axis of the intermediary transfer wheel 16 is located on the straight line L that connects the respective axes of the first turning transmission wheel 5 and the second turning transmission wheel 6. The intermediary transfer wheel 16 moves along the support shaft 17 in this condition.

FIGS. 11(b) and (c) are modifications of the embodiment 2 shown in FIGS. 9 and 10. FIG. 11(b) shows the condition where the intermediary transfer wheel 16 is separated from the first turning transmission wheel 5 and the second turning transmission wheel 6, thus, the clutch is turned off, and the transmission is released.

FIG. 11(c) shows the condition where the clutch is turned on, and the intermediary transfer wheel 16 contacts with the first turning transmission wheel 5 and the second turning transmission wheel 6. In this condition, similar to the illustration of FIG. 11(a), the intermediary transfer wheel 16 is located between the first turning transmission wheel 5 and the second turning transmission wheel 6, and the axis of the intermediary transfer wheel 16 is located on the straight line L that connects the respective axes of the first turning transmission wheel 5 and the second turning transmission wheel 6.

Next, FIGS. 12(a)-(c) and FIGS. 13(a)-(c) are drawings showing the modification of the intermediary transfer wheel feeding mechanism in the embodiment 1 (the same applies to the embodiment 2 as well).

Although the modification shown in FIG. 12(a) is almost identical to the configuration shown in FIG. 5, this configuration has flat and circular convex surfaces 48 formed at both surfaces of the intermediary transfer wheel 16, and the convex surfaces 48 rotatably contact with both the front feeding piece 26 and the rear feeding piece 27. By forming this convex surfaces 48, the power loss of the intermediary transfer wheel 16 is decreased since the contact friction surface is decreased between the intermediary transfer wheel 16 and each of the front feeding piece 26 and the rear feeding piece 27.

The modification shown in FIGS. 12(b)-(c) and FIGS. 13(a)-(c) is another example of modification of the intermediary transfer wheel feeding mechanism. A feeding base 49 is fixedly attached to the end of the moving arm 24, and on the top surface of the feeding base 49, a pair of front contact arms 50 and a pair of rear contact arms 51 stand upright in such a way that they can contact with the front and rear of the intermediary transfer wheel 16.

FIG. 12(b) shows the modification where the front and rear surfaces of the intermediary transfer wheel 16 are flat similar to that shown in FIG. 5. FIG. 12(c) shows the modification where the front and rear surfaces of the intermediary transfer wheel 16 have convex surfaces 48 similar to that shown in FIG. 12(a). FIG. 13(a) shows the modification where the front and rear surfaces of the intermediary transfer wheel 16 have gently sloped convex surfaces 52.

As shown in FIG. 13(a), in the configuration where the front and rear surfaces of the intermediary transfer wheel 16 have the gently sloped convex surfaces, upon the clutch is turned on, and especially as applied to the embodiment 2, the tips of the contact arms 51 are prevented from bumping on the edge of the convex surfaces 52 when the intermediary transfer wheel 16 separated from the turning transmission wheels is placed into the front contact arms 50 and the rear contact arms 51.

The modifications shown in FIGS. 13(b) and 3(c) are almost identical to the configuration shown in FIG. 12(b), however, in FIG. 12(b), the front contact arms 50 and the rear contact arms 51 almost fully contact with the front and rear of the intermediary transfer wheel 16 in the longitudinal direction so that contact friction surface area will increase. In the modifications shown in FIGS. 13(b) and (c), the contact friction surface area is decreased by using support members 53 that are spot-shaped formed on the front contact arm 50 and the rear contact arms 51 so that the support members 53 partially contact with the front and back of the intermediary transfer wheel 16.

INDUSTRIAL APPLICABILITY

The transmission under the present invention has a simple structure comprising two turning transmission wheels each having a right circular cone trapezoid shape, and an intermediary transfer wheel which contacts with the two turning transmission wheels. The clutch function can be integrally and synergistically added in a simple manner by contacting or releasing the contact of the outer peripheral surface of the intermediary transfer wheel to and from the two turning transmission wheels. Accordingly, the transmission can be used for a drive system (clutch, transmission) of a motor vehicle that requires various operational functions for driving.

What is claimed is:

1. A transmission for transmitting a force comprising:
  a first rotation shaft coaxially fixed to a first turning transmission wheel;
  a second rotation shaft coaxially fixed to a second turning transmission wheel where the first and second rotation shafts are arranged in parallel with each other;
  a support shaft extended between the first turning transmission wheel and the second turning transmission wheel;
  a reciprocal movement mechanism that moves the support shaft to a first location which is close to the first turning transmission wheel and the second turning transmission wheel or a second location which is away from the first turning transmission wheel and the second turning transmission wheel;
  an intermediary transfer wheel formed on the support shaft rotatably and movably along a longitudinal direction of the support shaft;
  an intermediary transfer wheel feeding device that drives the intermediary transfer wheel, the intermediary transfer wheel feeding device comprising a moving arm, a drive mechanism that drives the moving arm in the longitudinal direction along the support shaft, and a feeding member provided at an end of the moving arm that moves the intermediary transfer wheel in the longitudinal direction along the support shaft; and
  a control unit for controlling operations of the reciprocal movement mechanism and the intermediary transfer wheel feeding device;
  wherein the first rotation shaft is rotated by a power device, and a rotational force of which can be transmitted to the second rotation shaft with variable speed;
  wherein each of the first turning transmission wheel and the second turning transmission wheel is formed in a shape of a right circular cone or a right circular cone trapezoid and has an identical vertex angle, and a tapered side peripheral surface of each of the first turning transmission wheel and the second turning transmission wheel faces each other with a constant distance;

the support shaft is arranged between the side peripheral surface of the first turning transmission wheel and the side peripheral surface of the second turning transmission wheel such that it extends in the longitudinal direction along the side peripheral surface of the first turning transmission wheel and the side peripheral surface of the second turning transmission wheel; and wherein when the support shaft is in the first location, the intermediary transfer wheel contacts with each of the side peripheral surface of the first turning transmission wheel and the side peripheral surface of the second turning transmission wheel and is moveable in the longitudinal direction along the support shaft while maintaining the contact, and when the support shaft is in the second location, the intermediary transfer wheel separates from each of the side peripheral surface of the first turning transmission wheel and the side peripheral surface of the second turning transmission wheel.

2. A transmission as defined in claim 1, wherein the control unit receives brake information indicating control condition of a brake, accelerator information indicating acceleration condition by an accelerator, power information indicating the operational condition of a power system, and load information indicating a degree of load, thereby controlling operations of the reciprocal movement mechanism and the intermediary transfer wheel feeding device based on the received information.

3. A transmission as defined in claim 1, wherein the feeding member has a front feeding piece which faces a front surface of the intermediary transfer wheel and a rear feeding piece which faces a rear surface of the intermediary transfer wheel.

* * * * *